United States Patent [19]

Trick et al.

[11] Patent Number: 5,351,569
[45] Date of Patent: Oct. 4, 1994

[54] MOTOR VEHICLE CHANGE-SPEED GEARBOX

[75] Inventors: Wolfgang Trick, Hochdorf; Detlef Schnitzer, Denkendorf, both of Fed. Rep. of Germany

[73] Assignee: Mercedes-Benz AG, Fed. Rep. of Germany

[21] Appl. No.: 937,754

[22] Filed: Sep. 1, 1992

[30] Foreign Application Priority Data

Sep. 3, 1991 [DE] Fed. Rep. of Germany ....... 4129290

[51] Int. Cl.$^5$ ............................................. F16H 3/08
[52] U.S. Cl. .................................. 74/329; 475/207
[58] Field of Search ................... 475/207, 218; 74/333, 74/329

[56] References Cited

U.S. PATENT DOCUMENTS

| | | | |
|---|---|---|---|
| 959,878 | 5/1910 | Page | 74/329 |
| 1,182,379 | 5/1916 | Johnson | 74/329 |
| 1,225,851 | 5/1917 | Phillips et al. | 74/329 |
| 1,250,549 | 12/1917 | Blydenburgh | 74/329 |
| 2,001,141 | 5/1935 | Kittilsen | 74/329 |
| 2,177,951 | 10/1939 | Simpson | 475/207 OR |
| 2,376,429 | 5/1945 | Harry | 475/218 OR |
| 2,576,478 | 11/1951 | Beckwith | 475/207 X |
| 2,787,919 | 4/1957 | Senkowski et al. | 475/207 X |
| 4,403,526 | 9/1983 | Numazawa et al. | 475/207 X |
| 4,478,101 | 10/1984 | Rumsa | |
| 4,721,002 | 1/1988 | Horii | 74/329 |
| 5,062,822 | 11/1991 | Nakayama et al. | 475/207 X |
| 5,123,293 | 6/1992 | Umemoto et al. | 475/207 X |

FOREIGN PATENT DOCUMENTS

| | | |
|---|---|---|
| 2916738 | 1/1980 | Fed. Rep. of Germany . |
| 0054750 | 4/1980 | Japan ................. 475/207 |

OTHER PUBLICATIONS

Johannes Looman, Zahnradgetriebe, Grundlagen, Konstruktionen, Anwendungen in Fahrzeugen, 1988 (5 pages).

ZF-Ecosplit, Synchron–und Klauengetriebe für den schweren Lkw, (3 pages).

*Primary Examiner*—Dirk Wright
*Attorney, Agent, or Firm*—Evenson, McKeown, Edwards & Lenahan

[57] ABSTRACT

A change-speed gearbox is arranged such that two gear stages (constant mesh gears) are used between an input shaft and a parallel countershaft, and one gear stage is used between the countershaft and a parallel output shaft. A gearbox range with at least three gearbox types with different permissible input torques is obtainable in that two of the three gear stages have a step-up transmission ratio so that the total transmission ratio becomes lower from gearbox type to gearbox type as the input torque increases.

9 Claims, 2 Drawing Sheets

MOTOR VEHICLE CHANGE-SPEED GEARBOX

CROSS-REFERENCE TO RELATED APPLICATIONS

This application is related to application Ser. No. 07/937,757 filed on Sep. 1, 1992 in the name of Torsten Kroger for ENGINE CONTROL APPARATUS FOR REDUCING ENGINE TORQUE; based upon an application filed in Germany on Sep. 7, 1991 having Ser. No. P 41 29 783.0, the subject matter of which is incorporated herein by reference.

BACKGROUND AND SUMMARY OF THE INVENTION

The present invention concerns a change-speed gearbox for motor vehicles, and more particularly, to a change-speed gearbox having an input shaft, an output shaft, a countershaft located parallel to the input and output shafts, a respective drive connection between the input shaft and the countershaft via two gear stages arranged to be alternatively selected, and a drive connection between the countershaft and the output shaft via a further gear stage, in which a countershaft gearwheel of one of the gear stages has a smaller number of teeth than a main shaft gearwheel engaging therewith and only two of the three gear stages have the same total number of teeth.

A sixteen-speed change-speed gearbox for motor vehicles of the aforementioned type is shown in Publication F 43 239/RT 33 26-887, Page 10, FIG. 5, Zahnradfabrik Friedrichshafen AG, Löwentaler Str. 100, 7990 Friedrichshafen 1, Federal Republic of Germany. Three gear stages are used between the countershaft and output shaft to form one transmission ratio each for forward propulsion, and a fourth gear stage with an idler gearwheel is used to form a transmission ratio for rearward propulsion. Thus, by multiplication with the two transmission ratios of the gear stages used as constant mesh gears between the input shaft and the countershaft, eight transmission ratios are obtained for forward propulsion because the constant mesh gear adjacent to the main gearbox can also be employed as the fourth gear stage of the main gearbox, and two transmission ratios for reverse propulsion are also obtained. A two-stage range-change gear is also fitted downstream of the output shaft so that, with its two transmission ratios, there is a total of sixteen forward gears and four possible reverse gears.

In the known change-speed gearbox, the total number of teeth (i.e. the sum of the number of teeth of the countershaft gearwheel and the number of teeth of the main shaft gearwheel engaging with the countershaft gearwheel) of the two constant mesh gears is the same. In the gear stage between the countershaft and the output shaft which is used to form the third and fourth lowest transmission ratios between the input and output shafts, however, the countershaft gearwheel has a smaller number of teeth than the main shaft gearwheel which engages therewith. The known change-speed gearbox is, of course, designed for a certain permissible input torque with a magnitude of, for example, 1,600 Nm.

An object on which the present invention is based consists essentially in creating a range of gearboxes with several gearbox types for different permissible input torques while keeping the number of parts to a minimum.

The foregoing object has been achieved in accordance with the present invention by providing that a second countershaft gearwheel, associated with one of the two gear stages having the same total number of teeth, has a smaller number of teeth than an associated main shaft gearwheel.

In a change-speed gearbox according to the invention, it is now possible to start with a basic gearbox which is configured for a certain permissible input torque and has a gearbox construction in which a main gearbox operates with a plurality of gear stages between the countershaft and the output shaft. In one of these gear stages, the countershaft gearwheel is provided with a smaller number of teeth than the main shaft gearwheel which engages with it and which is seated, in this instance, as a loose wheel on the output shaft. Two gear stages used as so-called constant mesh gears are connected into the force path before the main gearbox. These gear stages used as constant mesh gears can be alternatively selected in order to produce a drive connection between the input shaft and the countershaft. These two gear stages have the same total number of teeth, i.e. the sum of the two numbers of teeth of one gear stage is equal to the sum of the two numbers of teeth of the other gear stage.

The present invention advantageously permits, as an initial possibility, a first gearbox type A of a gearbox range, in which gearbox the permissible input torque is increased relative to the basic gearbox and the slower of the two gear stages used as constant mesh gears in the basic gearbox is replaced by a gear stage in which the countershaft gearwheel has a smaller number of teeth than the main shaft gearwheel engaging with it which, in this instance, is seated on the input shaft. As a result, the constant mesh gear is now used to form the second highest transmission ratio of the main gearbox, i.e. that between the speed of the input shaft and the speed of the output shaft, and also for forming the lowest transmission ratio of the main gearbox.

The present invention makes a further gearbox type B possible in which the permissible input torque is increased relative to the gearbox type A and the countershaft gearwheel of the second gear stage used to produce a drive connection between the input shaft and the countershaft also has a smaller number of teeth than the main shaft gearwheel engaging therewith. The faster of the two gear stages operating as constant mesh gears is then again used to form both the second highest and the lowest transmission ratio of the main gearbox, i.e. between the speeds of the input shaft and the output shaft.

The gearwheel pairing of the "fast" constant mesh gear of the gearbox type A and the gearwheel pairing of the slower constant mesh gear of the gearbox type B can be identical.

The present invention also advantageously makes a third gearbox type C possible in which both the permissible input torque (relative to the gearbox type B) and the transmission ratio of the faster constant mesh gear (relative to the faster constant mesh gear of the gearbox type B) are increased.

The present invention further achieves the smallest possible number of parts because in the gearbox type B, the slower constant mesh gear is the same, in terms of transmission ratio and total number of teeth, as the fast constant mesh gear of the gearbox type A and the faster constant mesh gear can be the same, in terms of transmission ratio and total number of teeth, as the slower constant mesh gear of the gearbox type C and because the gear stage for producing a drive connection between the countershaft and the output shaft in the gearbox types B and C can be the same, in terms of transmission ratio and total number of teeth, as the slower constant mesh gear of the gearbox type A.

The present invention additionally makes possible in an advantageous manner a range with at least three gearbox types for each change-speed gearbox which has the otherwise basic known arrangement. Such arrangement can also be extended, in accordance with the present invention, to give a gearbox range irrespective of whether a range-change gear or downstream gearbox is additionally located in the force path downstream of the main gearbox which has the gear stages between the countershaft and the output shaft.

In terms of achieving the smallest possible number of parts, all the gearbox types associated with the gearbox range according to the invention have the same gearbox casing, the same gearbox shafts, the same selector clutches (synchronizing or claw clutches) and, with the exception of the two constant mesh gears and the one gear stage of the main gearbox, the same gearwheels also.

In the gearbox range according to the present invention, all the associated gearbox types have the same overall transmission ratio spread, the same gear steps and the same number of forward gears. Moreover, all the associated gearbox types can be operated by using the same shift scheme, provided a two-stage range-change gear is employed, using, for example, the known double-H shift pattern. The transmission range is displaced from gearbox type to gearbox type in the "fast" direction so that the higher permissible input torques also remain tolerable in the drive train after or downstream of the gearbox (e.g., for the propeller shaft, distributor gearbox, if present, and axles). The overall transmission ratio required ($i_{gearbox} \cdot i_{rear\ axle}$) for the vehicle is achieved by the corresponding rear axle transmission ratio.

BRIEF DESCRIPTION OF THE DRAWINGS

These and other objects, features and advantages of the present invention will become more apparent from the following detailed description of a currently preferred embodiment of a gearbox range with three gearbox types of a change-speed gearbox when taken in conjunction with the accompanying drawings wherein.

DETAILED DESCRIPTION OF THE DRAWINGS

Figure 1:
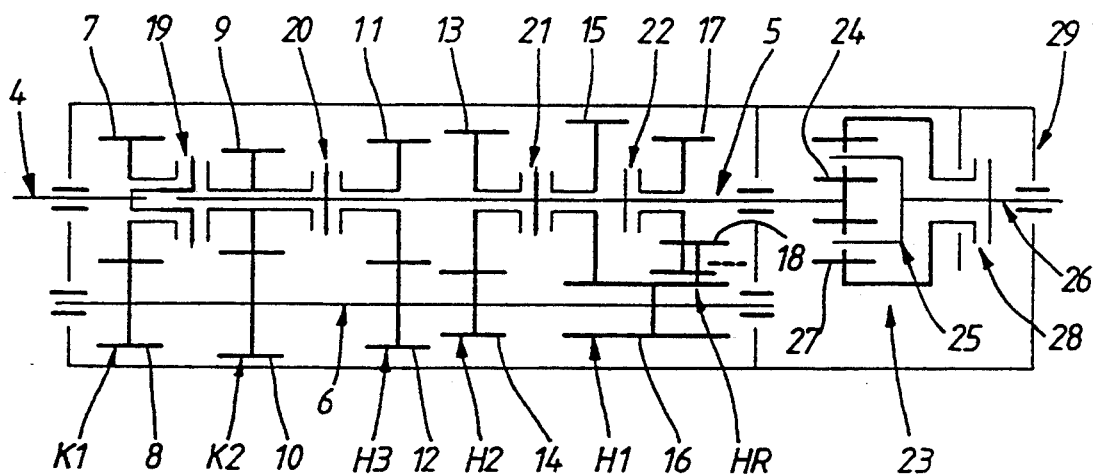
FIG. 1 is a gearbox schematic diagram of a sixteen-speed change-speed gearbox according to the present invention.

Referring to the change-speed gearbox of FIG. 1, an input shaft 4 and a coaxial output shaft 5 are located parallel to a countershaft 6. Countershaft gearwheels 8, 10, 12, 14 and 16 are seated on the countershaft 6 so that they are torsionally and axially fixed and they respectively engage with main shaft gearwheels 7, 9, 11, 13 and 15. All the main shaft gearwheels are arranged as loose wheels.

The gearwheels 7 and 8 form a gear stage K1 which is used, as a so-called constant mesh gear for producing a drive connection between the input shaft 4 and the countershaft 6.

The gearwheels 9 and 10 form a gear stage K2 which can also be used as a so-called constant mesh gear for producing a drive connection between the input shaft 4 and the countershaft 6. The main shaft gearwheels 7 and 9 of the two gear stages K1 and K2 can be optionally connected to the input shaft 4 by a change-speed selector clutch 19. The gearwheel 7 is supported on the input shaft 4, while the gearwheel 9 is supported on the output shaft 5.

The mutually engaging gearwheels 11, 12 and 13, 14 and 15, 16 respectively form gear stages H3, H2 and H1 of a main gearbox which also includes a gear stage HR with a main shaft gearwheel 17 and an idler gearwheel 18. The idler gearwheel 18 engages with both the countershaft gearwheel 16 of the gear stage H1 and the main shaft gearwheel 17 seated as a loose wheel on the output shaft 5.

The main shaft gearwheels 9, 11 and 13, 15 can be optionally connected to the output shaft 5 by respective selector clutches 20 and 21. The main shaft gearwheel 17 of the gear stage HR operating as the reverse gear can be connected to the output shaft 5 by a selector clutch 22.

An epicyclic range-change gear 23 is downstream of the main gearbox in the force path, and has an inner central wheel 24 torsionally connected to the output shaft 5, a planet carrier 25 torsionally connected to a gearbox output shaft 26, an outer central wheel 27 and a clutch and brake device 28. Planet wheels engaging with both central wheels 24 and 27 are rotatably supported on the planet carrier 25. The outer central wheel 27 is connected to the output shaft 26 in one end position of the device 28 to produce a 1:1 transmission ratio from the range-change gear 23. In the other end position of the device 28, the outer central wheel 27 is fixed so that it cannot rotate relative to the gearbox casing 29 of the change-speed gearbox and, consequently, a transmission ratio greater than 1 is selected in the range-change gear 23.

The gearbox types A to C differ only in the transmission ratios of one or two of the gear stages K1, K2 and H3.

In the gearbox type A, the number of teeth of the countershaft gearwheel 8 ($z_8 = 31$) of the gear stage K1 is smaller than the number of teeth of the associated main shaft gearwheel 7 ($z_7 = 32$). The gear stage K1 used as the constant mesh gear therefore has a step-up transmission ratio.

In contrast, the number of teeth of the countershaft gearwheel 10 ($z_{10} = 34$) in the gear stage K2 which can also be used as a constant mesh gear is larger than the number of teeth of the associated main shaft gearwheel 9 ($z_9 = 29$).

In the third gear stage H3, the number of teeth of the countershaft gearwheel 12 ($z_{12}=27$) is again lower than the number of teeth of the associated main shaft gearwheel 11 ($z_{11}=34$) so that the gear stage H3 has a step-up transmission ratio.

Figure 3:
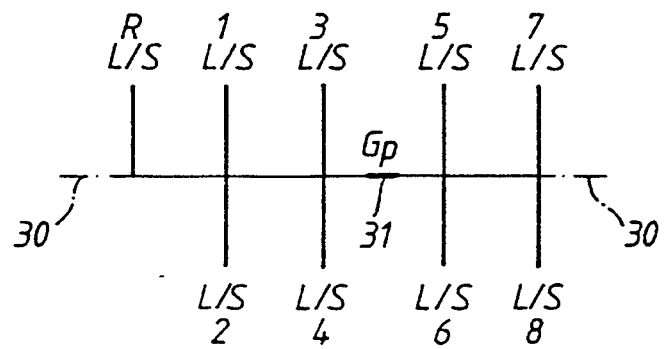
FIG. 3 is a shift pattern used to change the gears of all three gearbox types A to C of the change-speed gearbox of FIG. 1.

Gear changing in the gearbox type A takes place according to the shift scheme of FIG. 3, which represents a so-called double-H shift pattern. In this shift pattern, the shift slots 1-2 and 3-4, together with the common selection slot 30-30, form a first H and the shift slots 5-6 and 7-8 form a second H. When the manual gear lever is changed from one H into the other, i.e. when it passes over the section 31 of the selection slot 30-30 located between the shift slots 3-4 and 5-6, the range-change gear 23 is made to change gear.

On the side of the shift slot 1-2 opposite to the shift slot 3-4, there is an additional shift slot R for the two reverse gears which are used.

When the manual gear lever is moved into the position 1L for the lowest gear, the main shaft gearwheel 9 of the slower gear stage K2 is connected to the input shaft 4 by the change-speed selector clutch 19 and the main shaft gearwheel 15 of the gear stage H1 is connected to the output shaft 5 by the change-speed selector clutch 21. In the position 1L, the range-change gear 23 is in its position for the transmission ratio greater than 1. By operating a manual switch, it is possible to change into the gear 1S so that the main shaft gearwheel 7 of the fast gear stage K1 is now connected to the input shaft 4 while the gear stage H1 remains selected.

When the manual gear lever is moved into the position 2L, the main shaft gearwheel 13 of the gear stage H2 is now connected to the output shaft 5 by the change-speed selector clutch 21, and the main shaft gearwheel 9 of the slower gear stage K2 is connected to the input shaft 4. A change to the fast gear stage K1 in order to select the gear 2S again takes place by the manual switch.

When the manual gear lever is moved into the position 3L, the main shaft gearwheel 9 of the slower gear stage K2 is connected to the input shaft 4 by the change-speed selector clutch 19, and the main shaft gearwheel 11 of the gear stage H3 is connected to the output shaft 5 by the change-speed selector clutch 20. A change to the faster gear stage K1 to select the gear 3S again takes place by use of the manual hand switch.

When the manual gear lever is moved into the position 4L, the main shaft gearwheel 9 of the gear stage K2 is connected to both the input shaft 4 and the output shaft 5 by the two change-speed selector clutches 19, 20 so that the transmission ratio 1:1 is selected in the main gearbox between the input shaft 4 and the output shaft 5 and the overall transmission ratio between the input shaft 4 and the gearbox output shaft 26 is equal to the transmission ratio of the range-change gear 23.

By selecting the gear 4S by the manual switch, the input shaft 4 is now connected to the main shaft gearwheel 7 of the faster gear stage K1 by the change-speed selector clutch 19 so that, due to the reversed force path, the gear stage K2 also operates with a step-up transmission ratio.

Figure 2:
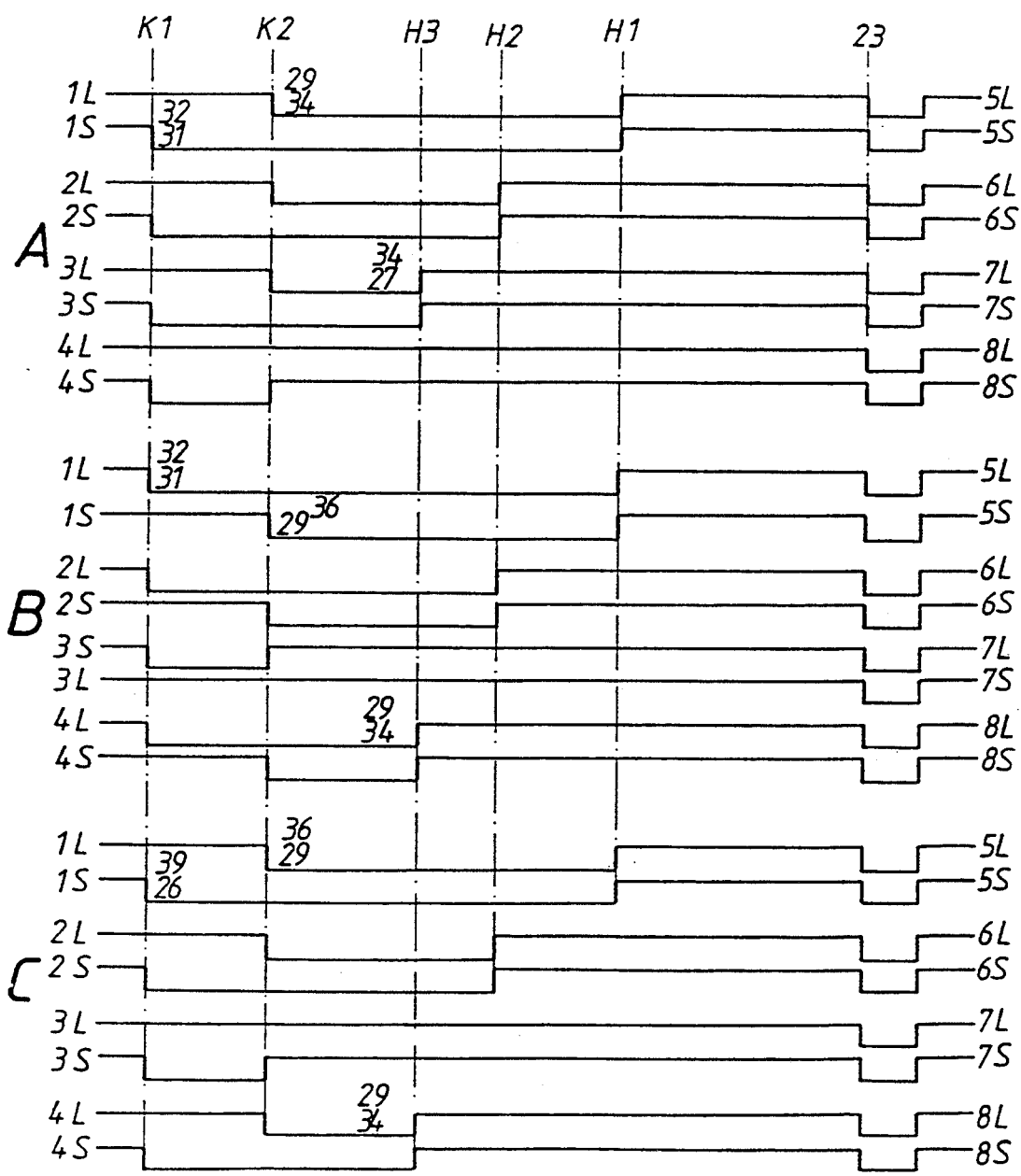
FIG. 2A is the force path in the individual forward gears through the change-speed gearbox of FIG. 1 when the latter is configured as a gearbox type A of the gearbox range.
FIG. 2B is the force path in the individual forward gears through the change-speed gearbox of FIG. 1 when the latter is configured as a gearbox type B of the gearbox range.
FIG. 2C is the force path in the individual forward gears through the change-speed gearbox of FIG. 1 when the latter is configured as a gearbox type C of the gearbox range.

When the manual gear lever is moved into the position 5L, the range-change gear 23 is switched over to its 1:1 transmission ratio whereas the main gearbox is brought into the position for the gear 1L with the associated constant mesh gear. In other words, the same gear-changing procedures take place in known manner in the shift slots 5-6 and 7-8 of one H shift pattern as take place in the shift slots 1-2 and 3-4 of the other H shift pattern, as is represented by the force path lines for the positions 5L/S to 8L/S in FIG. 2. A further description is therefore unnecessary.

Whereas in the case of the gearbox type A, therefore, only the one gear stage K1 used as constant mesh gear has a step-up transmission ratio ($z_7/z_8=32/31$) and the second gear stage H3 having a step-up transmission ratio ($z_{11}/z_{12}=34/27$) is associated with the main gearbox, the gearbox type B differs from this in that instead of the gear stage H3 of the main gearbox, the second gear stage K2 used as constant mesh gear now also has a step-up transmission ratio ($z_9/z_{10}=36/29$), this gear stage being the "faster" relative to the other gear stage K1 used as constant mesh gear which has the transmission ratio $z_7/z_8=32/31$.

Consequently, in the case of the gearbox type B, the faster gear stage K2 is used in corresponding manner in exactly the same way as the faster gear stage K1 of the gearbox type A to form both the second highest gear transmission ratio 1S and the lowest gear transmission ratio 4S, together with the intermediate transmission ratios, of the main gearbox. With the exception of the gear sequence K1–K2=S-L for the gearbox type A and the gear sequence K1–K2=L-S for the gearbox type B, the gear changes and the shift pattern for the two gearbox types A and B are the same.

The gear stages K1 of the two gearbox types A and B are identical. In addition, the gear stage K2 of the gearbox type A and the gear stage H3 of the gearbox type B are identical.

The gearbox type C differs from the gearbox type B only by the fact that in the former, the gear stage K1 used as constant mesh gear has a faster transmission ratio ($z_7/z_8=39/26$) than the transmission ratio of the other gear stage K2 which can be used as constant mesh gear. Because the gear stage K1 also has a faster transmission ratio than the gear stage K2 in the gearbox type A, the gear-changes are the same in the two gearbox types A and C, as this is also indicated by the force path lines of FIGS. 2A and 2C so that no further description is necessary.

The gear stages K2 and H3 are identical in the two gearbox types B and C.

With the exception of the described differences, in accordance with the invention, in certain numbers of teeth in the first three gear stages K1, K2 and H3, all the gearbox types A to C are identical with the change-speed gearbox of FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A change-speed gearbox for providing multiple transmission ratios in a motor vehicle, comprising an input shaft, an output shaft, a countershaft located parallel to the input and output shafts, a respective drive connection between the input shaft and the countershaft via two gear stages, means for alternatively selecting one of the two gear stages, and a drive connection between the countershaft and the output shaft via a further gear stage, wherein a first countershaft gearwheel of one of the gear stages has a smaller number of teeth than a main shaft gearwheel engaging therewith, only two of the three gear stages have the same total number of teeth, and a second countershaft gearwheel, associated with one of the two gear stages having the same total number of teeth, has a smaller number of teeth than an associated main shaft gearwheel.

2. The change-speed gearbox according to claim 1, wherein in a configuration in which the two gear stages are used as the drive connection between the input shaft and the countershaft, the countershaft gearwheel one of the two gear stages has a smaller number of teeth than the main shaft gearwheel of one of the other of the two gear stages and of the same one of the two gear stages.

3. The change-speed gearbox according to claim 1, wherein the total number of teeth in one of the two gear stages used as drive connection between the input shaft and the countershaft is the same as the total number of teeth in the other of the two gear stages.

4. The change-speed gearbox according to claim 1, wherein the second countershaft gearwheel is arranged to form a transmission ratio which is second highest of the multiple transmission ratios between rotational speeds of the input and output shafts.

5. The change-speed gearbox according to claim 1, wherein the second countershaft gearwheel is arranged to form a transmission ratio which is lowest of the multiple transmission ratios between rotational speeds of the input and output shafts.

6. The change-speed gearbox according to claim 1, wherein of the two gear stages configured to provide a drive connection between the input shaft and the countershaft, one of the two gear stages with a higher transmission ratio is used to form the lowest transmission ratio which is lowest of the multiple transmission ratios between rotational speeds of the input and output shafts.

7. A gearbox range having a change-speed gearbox with an input shaft, an output shaft, a countershaft located parallel to the input and output shafts, a respective drive connection between the input shaft and the countershaft via two gear stages arranged to be alternatively selected, and a drive connection between the countershaft and the output shaft via a further gear stage, wherein a first countershaft gearwheel of one of the gear stages has a smaller number of teeth than a main shaft gearwheel engaging therewith and only two of the three gear stages have the same total number of teeth, a second countershaft gearwheel, associated with one of the two gear stages having the same total number of teeth, has a smaller number of teeth than an associated main shaft gearwheel, and having a first configuration such that the countershaft gearwheel has the smaller number of teeth on only one of the two gear stages used to produce a drive connection between the input shaft and the countershaft having a respective second and third configuration in which one of the two gear stages are used as the drive connection between the input shaft and the countershaft, the countershaft gearwheel one of the two gear stages has a smaller number of teeth than the main shaft gearwheel of one of the other of the two gear stages and of the same one of the two gear stages, and the total number of teeth in one of the two gear stages used as drive connection between the input shaft and the countershaft is the same as the total number of teeth in the other of the two gear stages in which the countershaft gearwheels of the two gear stages used to produce a drive connection between the input shaft and the countershaft have the smaller number of teeth, wherein the other of the two gear stages configured to provide a drive connection between input shaft and countershaft in the first configuration of the change-speed gearbox and a gear stage is operatively arranged to provide a drive connection between the countershaft and the output shaft in the second and third configuration of the change-speed gearbox and has the same transmission ratio and the same total number of teeth.

8. A gearbox range with a first configuration of change-speed gearbox comprising an input shaft, an output shaft, a countershaft located parallel to the input and output shafts, a respective drive connection between the input shaft and the countershaft via two gear stages arranged to be alternatively selected, and a drive connection between the countershaft and the output shaft via a further gear stage, wherein a first countershaft gearwheel of one of the gear stages has a smaller number of teeth than a main shaft gearwheel engaging therewith and only two of the three gear stages have the same total number of teeth, and a second countershaft gearwheel, associated with one of the two gear stages having the same total number of teeth, has a smaller number of teeth than an associated main shaft gearwheel, wherein the countershaft gearwheel of only one of the two gear stages configured to provide a drive connection between the input shaft and countershaft has the smaller number of teeth and a second configuration of change-speed gearbox in a configuration wherein the two gear stages are used as the drive connection between the input shaft and the countershaft, the countershaft gearwheel one of the two gear stages has a smaller number of teeth than the main shaft gearwheel of one of the other of the two gear stages and of the same one of the two gear stages, wherein the countershaft gearwheels of both gear stages configured to provide a drive connection between input shaft and countershaft have the smaller number of teeth, with one of the two gear stages providing the drive connection between input shaft and countershaft in the first change-speed gearbox configuration in which the countershaft gear wheel has the smaller number of teeth, and the slower of the two gear stages providing a drive connection between input shaft and countershaft in the second change-speed gearbox configuration having both the same transmission ratio and the same total number of teeth.

9. A gearbox range having one configuration of a change-speed gearbox comprising an input shaft, an output shaft, a countershaft located parallel to the input and output shafts, a respective drive connection between the input shaft and the countershaft via two gear stages arranged to be alternatively selected, and a drive connection between the countershaft and the output shaft via a further gear stage, wherein a first countershaft gearwheel of one of the gear stages has a smaller number of teeth than a main shaft gearwheel engaging therewith and only two of the three gear stages have the same total number of teeth, wherein a second countershaft gearwheel, associated with one of the two gear stages having the same total number of teeth, has a smaller number of teeth than an associated main shaft gearwheel and wherein in a configuration in which the two gear stages are used as the drive connection between the input shaft and the countershaft, the countershaft gearwheel one of the two gear stages has a smaller number of teeth than the main shaft gearwheel of one of the other of the two gear stages and of the same one of the two gear stages in which the two gear stages for providing a drive connection between input shaft and countershaft have unequal total numbers of teeth, and having a second configuration of change-speed gearbox wherein the total number of teeth in one of the two gear stages used as drive connection between the input shaft and the countershaft is the same as the total number of teeth in the other of the two stages, wherein the total number of teeth in the two gear stages used to produce a drive connection between input shaft and countershaft is the same, such that, in a faster of the two gear stages for providing a drive connection between input shaft and the countershaft of the one configuration of change-speed gearbox, and in a slower of the two gear stages for providing a drive connection between input shaft and the countershaft in the second configuration of the change-speed gearbox, both the transmission ratio and the total number of teeth are the same.

* * * * *